United States Patent [19]

Bernstein et al.

[11] 4,071,661
[45] Jan. 31, 1978

[54] PROCESS FOR REPAIRING DEFECTIVE BATTERY SEALS

[75] Inventors: Philip Bernstein, Yardley; James P. Coffey, Hatboro, both of Pa.; Stanley M. Davis, Princeton, N.J.

[73] Assignee: ESB Incorporated, Phila, Pa.

[21] Appl. No.: 713,682

[22] Filed: Aug. 12, 1976

[51] Int. Cl.² ............................................. H01M 6/50
[52] U.S. Cl. .................................. 429/49; 29/401 E; 156/94; 156/297
[58] Field of Search .................... 429/49, 185; 156/94, 156/297; 428/516, 523; 29/401 R, 401 E

[56] References Cited

U.S. PATENT DOCUMENTS

| 2,692,907 | 10/1954 | Wallace | 429/185 |
| 2,857,448 | 10/1958 | Gill | 429/185 |
| 3,865,662 | 2/1975 | Segal | 156/94 |

OTHER PUBLICATIONS

J.W.M., Battery Failure, Popular Science, p. 149(3), Sept. 1944.

Primary Examiner—Donald L. Walton
Attorney, Agent, or Firm—Gilbert W. Rudman; Gary V. Pack; Anthony J. Rossi

[57] ABSTRACT

A process is described for repairing secondary batteries which have defective seals. The process of repair can be performed safely while the battery is in operation.

9 Claims, 7 Drawing Figures

PROCESS FOR REPAIRING DEFECTIVE BATTERY SEALS

BACKGROUND OF THE INVENTION

1. Field of the Invention

This invention relates to a process for sealing secondary batteries. More particularly, it relates to a process for repairing defective seals of secondary batteries.

2. Description of the Piror Art

Casings for secondary batteries consists of containers and covers. Usually the containers and covers are molded of a thermoplastic material such as polystyrene, polymethacrylate, polyamide, polyolefin, polyvinyl chloride, polymethacrylate, and the like. After the battery is assembled, the space between the container and cover is sealed with a sealant compound.

Most sealant compounds are not entirely satisfactory because they are not able to provide a crackface seal during the total useful life of the battery. This is particularly true for secondary batteries exposed to vibration, very low or very high temperatures, and used for applications requiring a rugged long life device. Over the course of years the sealant compound may, for a variety of reasons, become brittle and often breaks, forming cracks and holes which allow solvent to evaporate and electrolyte to escape. For such batteries to remain useful the holes and cracks, i.e., the defective seal, must be repaired.

The known processes for repairing defective seals require the battery to be disconnected, removed from operation, and possibly moved to a different site for the repair to be done safely. The The process of the present invention provides for the repair to be done safely while maintaining the battery in operation and on-site.

SUMMARY OF THE INVENTION

The invention is a process for repairing a defective secondary battery while the battery is maintained in operation. The secondary battery is comprised of a container, a cover, a cell element located in the container, and a sealant area. The cell element has an anode, cathode, separator, and electrolyte. The sealant area comprises a sealant space located between the container and the cover, the portion of the container near the sealant space, the portion of the cover near the sealant space, and a sealant located in the sealant space. The battery is defective in that the sealant contains cracks and voids.

The process comprises preparing the defective sealant area, for example, by neutralizing, rinsing, cleaning and drying. Then positioning a repairant tape over the defective sealant area. The repairant tape is comprised of atactic polypropylene and non-conductive filler. Heating the repairant tape to a temperature sufficient to coat and repair the defective sealant area.

DETAILED DESCRIPTION OF THE INVENTION

The process of the current invention utilizes a repairant tape which is prepared by mixing an atactic polypropylene with a non-conductive filler and then forming, preferably by extrusion, the mixture into a tape having the desired dimensions.

The composition of the tape is 60% - 95% by weight based on the weight of the total composition atactic polypropylene and 5% - 40% by weight based on the weight of the total composition non-conductive filler. Preferably, the percentage by weight atactic polypropylene will be 65% - 90%, more preferably, 75% - 85%, and the balance non-conductive filler.

Atactic polypropylene useful in the repairant tape is, at room temperature, a noncrystalline, waxy, slightly tacky solid. It becomes softer and more tacky with increasing temperature and gradually becomes molten. Atatic polypropylene does not have a sharp melting point, but over a temperature range of 120° - 175° C, it becomes a viscous liquid that can be pumped by conventional means. The typical molecular weight range of atactic polypropylene is 3,000 - 10,000.

A preferred atactic polypropylene will have a softening point determined by ASTM - E28-51 of about 100° to 110° C, more preferably, 105° - 107° C; a viscosity determined by Brookfield Thermosel system of 5000 –9000 centipoisise at 149° C, more preferably 5500 - 8500 centipoises, and a density determined by ASTM-D792 at 23° C of 0.82 –0.90 grams per cubic centimeter, more preferably, 0.85 – 0.87 grams per cubic centimeter.

Examples of such atactic polypropylenes are Eastobond N5K, N5W, N500S, and N510S, all of which are sold by Eastman Chemical Products, Inc.

Non-conductive filler useful in the repairant tape can be a filler such as, for example, asbestos, talc, titanium dioxide, and carbon black. The non-conductive filler must be a material that is non-leachable under operative temperatures of the battery and hence not interfere with the operation of the battery.

Preferably the filler will be a carbon black having a medium particle size, i.e., able to pass through a 70 mesh sieve. A preferred carbon black is thermal black. More preferably, the thermal black will have a specific gravity of 1.80, and a moisture content of 0.5% maximum. Such a medium thermal black is Floform Thermax ASTM-N-990 sold by H. N. Royal, Inc. Filler having large particles is ground to reduce the particle size to the required size.

The repairant tape, once formed, will be low temperature melting, tacky, inert, and unaffected by secondary battery electrolyte. It will adhere to thermoplastic materials such as those which are utilized to construct containers and covers of battery casings, especially, thermoplastic materials such as polystyrene, polyethylene, and crystalline polypropylene.

Figure 1:
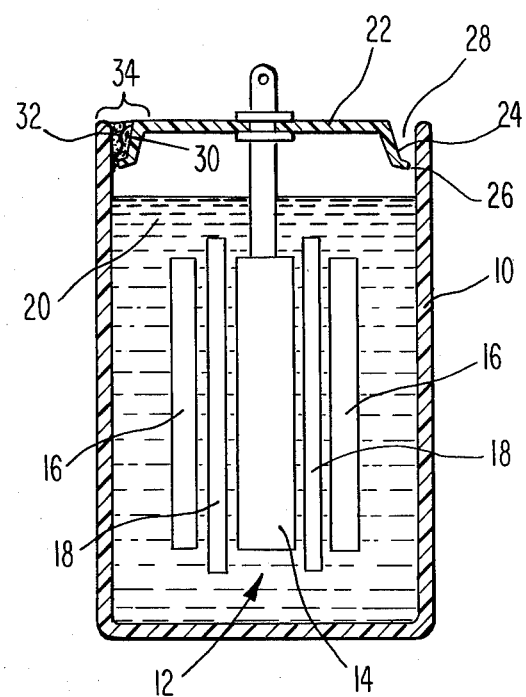
FIG. 1 shows in cross sectional view a secondary battery having a defective sealant area.

FIG. 1 shows a cross sectional view of a secondary battery which has a defective seal. The secondary battery container 10 has a cell element 12 located therein. The cell element is comprised of an anode 14, cathode 16, separator 18, and electrolyte 20. A cover 22 having a downwardly sloping lip 24 which at its lower point forms a fairly close fit 26 with the container, but having a more or less triangular sealant space 28. A sealant 30 has been placed into the sealant space to fill up the space and to form a continuous seal from the cover to the container. Through use, the sealant forms a defect 32, a crack, which must be prepared. The defective sealant area 34 is the top of the container, the sealant with its defect and the edge of the cover.

Figure 2:
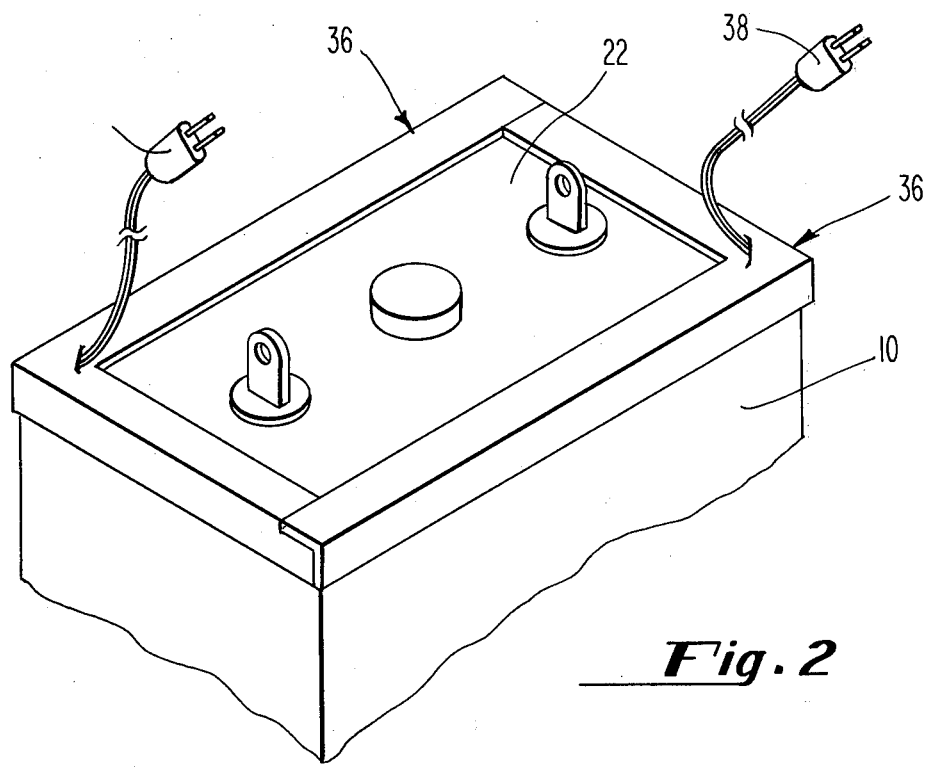
FIG. 2 shows a preferred heater in place upon a secondary battery having a defective sealant area.

FIG. 2 shows a heater 36 with its plug 38, which will be inserted into an electrical outlet, set upon a battery. The cover 22 and a portion of the container 10 are also shown. The preferred heater is formed of molded fiberglass reinforced silicone rubber which is flexible and shaped to enable easy insertion underneath intercell connectors during operation of the cell. The heaters are molded to the dimension required to fully cover the sealant area of each type battery. The heater has heating elements which are completely enclosed, with no exposed metallic, parts within the heater. The heater elements produce heat when electric current, supplied through the plug, pass through the elements.

Figure 3:
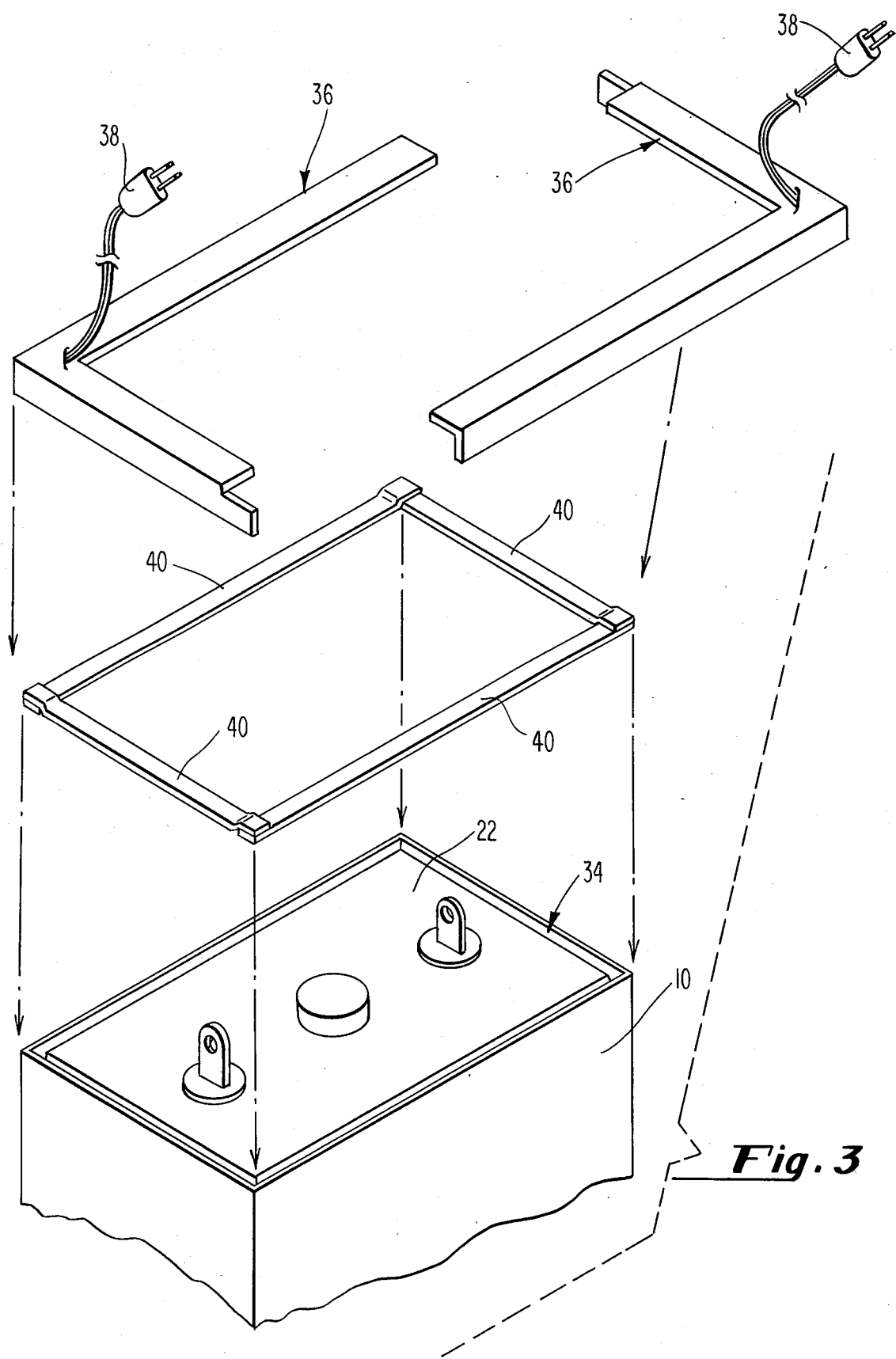
FIG. 3 shows an explosed view of FIG. 2 additionally showing the placement of the repairant tape.

FIG. 3 is an exposed view of FIG. 2. Repairant tape 40, has been cut into strips and placed over the sealant area 34. Preferably the repairant tape is cut into four strips, two having the same length as the battery, and two having a length equal to the width of the battery. Preferably the ends of the strips overlap. Two L shaped heaters 36 are placed upon the repairant tape covered battery. Each heater has its own plug 38.

Figure 4A:
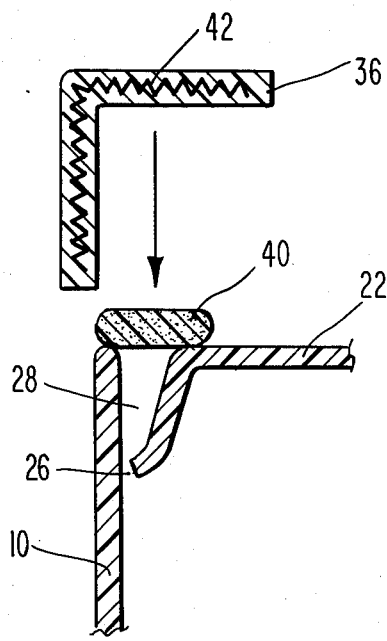
FIGS. 4a-4d are partial sectional views useful to disgrammatically explain the process in accordance with the invention.

FIG. 4a–4d are a diagrammatic representation of the process. In FIG. 4a defective sealant area 28 has been prepared. Usually the defective sealant area is prepared by merely neutralizing the area with a solution of Sodium Bicarbonate, then rinsing the area with water and then drying the area. In this diagram the sealant has been removed by scraping, therefore, the sealant area does not contain any sealant. The repairment tape will flow into the sealant space 28 forming a new seal instead of merely filling in the defective sealant area.

After the sealant area is prepared the repairant tape 40 is placed over the sealant area. The heater 36 with the fully enclosed heating element 42 is placed upon the battery.

Figure 4B:
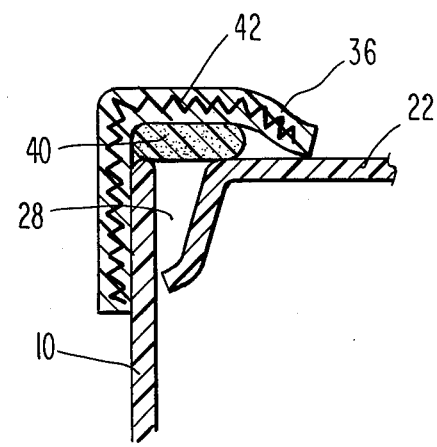

In FIG. 4b, the heater is in place, the sides of the heater are in contact with the cover and the container. The heat produced by the heater raise the temperature of the repairant tape.

The tape will then be heated to a temperature of 95° C to 125° C with the understanding that the lower the temperature the longer the time required for the heat to be applied. Preferably, the tape will be heated to 105° – 110° C for a period of approximately 1 to 20 minutes, more preferably, 5 to 15 minutes. The temperature used should not be higher than 125° C because some types of thermoplastic containers cannot withstand such high temperatures and the tape at such temperature may lost its physical integrity. The preferred heaters 36 are used to raise the temperature of the tape from ambient to 110° C over a period of approximately 2–10 minutes, the temperature is maintained at 110° C for approximately 5–15 minutes, and then the heater is turned off but is not removed from the sealant area until the tape has cooled.

Figure 4C:
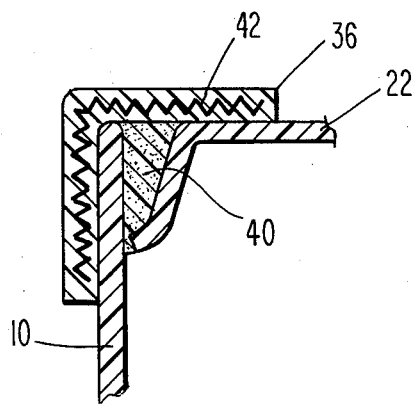

FIG. 4c shows the repairant tape after it has been placed over the sealant space. The heater is still in place because the tape has not cooled sufficiently to enable the heater to be removed without removing the tape with it.

Figure 4D:
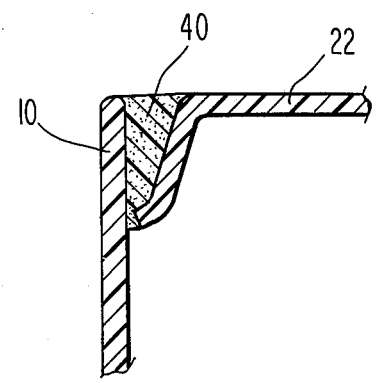

FIG. 4d shows the repaired battery with the repairant tape having flowed in the sealant space and forming a continuous seal free of all deficiencies.

EXAMPLE 1

A repairant tape was prepared as follows:

A. The following materials and equipment were assembled:
1. Eastobond M-500-S (a low molecular weight atactic polypropylene sold by Eastman Chemical Products, Inc.)
2. Thermax N-990 (a medium particle size thermal black sold by H. N. Royal, Inc.
3. 801S Release Paper (a one sided release paper sold by M & C Specialities.)
4. An extruder comprised of inch Dia. Brabender Plastograph, adjustable ribbon die, metering screw, conveyor and winding take-off.

B. The manufacturing procedure was as follows:
1. The Thermax N-990 was ground overnight and was sieved through a 70 mesh screen.
2. Eastobond M-500-S slats were cut into inch or smaller cubes.
3. 80 parts by weight cubes of Eastobond M-500-S and 20 parts of weight sieved Thermax N-990 were placed into a polyethylene bag.
4. The 80/20% mixture was mixed and blended by closing the bag and hand kneading for approximately 5 minutes to disperse Thermax N-900 over the surface of the Eastobond M-500-S.
5. The extruder was preheated as follows: Zone 1–150° C, Zone 2–75° C and Zones 3–4 off. The extruder die was water cooled.
6. Take-off release paper was placed opposite the extruder die to take up the mixture as it was extruder.
7. Mixture form the polyethylene bag was poured into the throat of the extruder and the extruder was started at 30 rpm.
8. The mixture speed was hand forced into the screw area using a push rod.
9. The screw speed was gradually increased from 30 to 50 rpm during a 5 minutes period.
10. The extrudate was taken up on the release paper as it emerged from the die, air cooled on the moving conveyor, and wound up into a roll of tape. The take-off line speed was adjusted to coincide with extrudate speed in order to minimize excessive drawdown effects.
11. Extruded tape was collected in rolls 10.67 meters long × 1.59 cm wide by 0.152 cm thick.

EXAMPLE 2

Secondary batteries having defective seals were repaired with safety while in operation and on-site by the following procedure and by using the repairant tape prepared in Example 1.

The batteries repaired were ESB - WECO -Type KCS-15544, sold by ESB Incorporated, assembled in polystyrene containers.

The procedure followed was:

A. Preparing the defective sealant area.
1. Neutralize the sealant area by wiping area with cloth dipped in neutralizing Sodium Bicarbonate solution.
2. Rinse the above neutralized area using a separate cloth dipped in water.
3. Dry the neutralized, wet sealant area by wiping or blotting with a dry clean absorbent cloth.

B. Placing the repairant tape over the defective sealant area.
1. The elasped time between the drying of the sealant area and this stage of the procedure by no more than ½ hour.

2. Cut strips of the repairant tape to the length & width dimensions of the cover. Keep the release paper on the tape while cutting.
3. Remove the release paper from each piece of tape before applying.
4. Carefully position the tape over the defective sealant area so that one edge of the tape is in contact and flush with the top outside edge of the container wall and the opposite edge of the tape is in contact with the battery cover.
5. Each piece of tape should overlap the other at each corner of the battery and should be laid in contact along its entire length with the battery cover, and the top edge of the container wall encasing sealant area.

C. Heating the repairant tape.
1. The heating means used were heaters having the heating element completely enclosed, with no exposed metallic parts, within molded fiberglass reinforced silicone rubber which is flexible and L-shaped to enable easy insertion underneath intercell connectors during operation of battery. The heaters are molded to the dimensions required for each type battery. Two heaters are required for each battery.
2. Carefully place the heater upon the battery so that the heater encases the sealant area for its entire length.
3. The heaters are used to heat the repairant tape from ambient to 110° C in about 6 minutes. The temperature is maintained at 110° C for 9 minutes. The heater is turned off but not removed.
4. The tape is then cooled for 30 minutes with the heaters in place.
5. Carefully remove the heaters.

We claim:
1. A process for repairing while in service, a secondary battery which is comprised of a container, a cover, a cell element located in the container, the element having an anode, a cathode, a separator and electrolyte, and a sealant area comprised of a sealant space, a sealant located in the sealant space and areas of the container and cover near the sealant space, said sealant area being defective in that the sealant contains cracks and voids; the process comprising
1 preparing the sealant area;
2 positioning a repairant tape over the defective sealant, the tape comprising
95–60% by weight atactic polypropylene, and
5–40% by weight non-conductive filler; and
3 heating the repairant tape to a temperature sufficient to coat and repair the defective sealant area.

2. The process of claim 1 wherein the repairant tape is heated with a heating means which is a molded fiberglass reinforced silicone rubber heater having the heating elements fully enclosed.

3. The process of claim 1 wherein the sealant area is prepared by neutralization, rinsing and drying.

4. The process of claim 1 wherein the tape is comprised of 75 to 85% by weight atactic polypropylene and 25 to 15% by weight of carbon black.

5. The process of claim 2, wherein the heating means is two L-shaped heaters.

6. The process of claim 1, wherein the tape is heated to a temperature of 95°–125° C.

7. The process of claim 6, wherein the tape is heated to a temperature of 105°–110° C for 1 to 20 minutes.

8. The process of claim 1 the process comprising
a. Preparing the sealant area by
1. neutralizing with a Sodium Bicarbonate solution,
2. rinsing, and
3. drying the neutralized sealant area;
b. positioning the repairant tape over the sealant area, the tape formed by extrusion and comprised of
75–85% by weight atactic polypropylene, and
25–15% by weight carbon black, wherein the polypropylene has a softening point determined by ASTM-E28-51 of 100 to 110° C, a viscosity determined by Brookfield Thermosel system of 5000 to 9000 centipoises at 149° C, and a density determined by ASTM-D-792 at 23° C of 0.82 – 0.96 grams per cubic centimeter; and wherein the carbon black is a thermal black having a specific gravity of about 1.80 and a moisture content of about 0.5% maximum; the positioning of the tape is over the defective sealant area with one edge of the tape in contact and flush with the top atactic edge of the container and the opposite edge of the tape in contact with the cover, the tape encasing the sealant area.
C. heating the repairant tape wherein the heating means is two L-shaped molded fiberglass reinforced silicone rubber heaters having the heating elements fully enclosed within the heater, wherein the heater heats the tape from ambient to 110° in 2–10 minutes, and maintains the temperature for 5–15 minutes, and wherein the heater is removed after the tape has cooled.

9. A battery having a sealant area repaired by the process of claim 1.

* * * * *